United States Patent [19]

Morimoto

[11] Patent Number: 4,850,935

[45] Date of Patent: Jul. 25, 1989

[54] TRANSMISSION RATIO CONTROL SYSTEM FOR A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 210,625

[22] Filed: Jun. 23, 1988

[30] Foreign Application Priority Data

Jun. 30, 1987 [JP] Japan ................................ 62-163391

[51] Int. Cl.[4] ....................... F16H 11/02; B60K 41/16
[52] U.S. Cl. ......................................... 474/18; 74/866
[58] Field of Search ...................... 474/11, 12, 17, 18, 474/28, 69, 70; 74/866–868; 364/424.1

[56] References Cited

U.S. PATENT DOCUMENTS 4,566,354  1/1986  Kumura et al. ...................... 74/866
4,674,363  6/1987  Miyawaki ............................ 474/18
4,730,522  3/1988  Morimoto ......................... 74/866 X

FOREIGN PATENT DOCUMENTS 58-180865  10/1983  Japan .

Primary Examiner—Thuy M. Bui
Attorney, Agent, or Firm—Martin A. Farber

[57] ABSTRACT

A control system for a continuously variable transmission for a motor vehicle has a transmission ratio control value for controlling the transmission ratio. The transmission ratio is controlled in accordance with a desired transmission ratio. During use of an air conditioner of the vehicle, the desired transmission ratio increases, so that necessary engine power can be obtained. The desired transmission ratio is increased by a larger value in a small transmission ratio range than a large transmission ratio range.

8 Claims, 5 Drawing Sheets

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio at reduction of engine power, for example, as a result of the operation of an air conditioner.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to decide the transmission ratio in accordance with a desired transmission ratio. The line pressure control valve is adapted to control the line pressure in accordance with the transmission ratio and the engine speed. The line pressure is controlled to prevent the belt from slipping on pulleys in order to transmit the output of the engine.

At the start of the vehicle, the transmission ratio is set at a maximum value. When the vehicle speed and engine speed reach set values under a driving condition, the transmission ratio starts to change (to upshift). The transmission ratio is automatically and continuously reduced at a changing speed which is decided by line pressure, pressure of oil supplied to the servo device of the drive pulley, and actual transmission ratio.

In such a system, in order to prevent overshooting or hunting at transient state, the convergence of the transmission ratio must be improved as well as the response of the system. Therefore, the desired transmission ratio and the control signal are corrected to obtain an optimum value during any driving condition.

Japanese Patent Laid Open 58-180865 (U.S. Pat. No. 4,566,354) discloses a control system wherein the transmission ratio is corrected to a large value during the cold engine, compared with the warmed-up state.

When an air conditioner is operated, the engine power likewise drops. Accordingly, it is preferable to increase the transmission ratio as in the above-mentioned prior art, thereby compensating the engine power. However, a transmission ratio of the continuously variable transmission is dependent on the engine speed and vehicle speed. Further, engine speed increases at high speed in a large transmission ratio range while the vehicle speed increases at low speed. On the other hand, the engine speed increases at low speed in a small transmission ratio range while the vehicle speed increases at high speed. The transmission ratio changing speed (rate) also changes with the engine speed. Therefore, if the transmission ratio is increased by a predetermined value constant as described in the above prior art, the increased value is too large the large transmission ratio range. Accordingly, the engine speed becomes very high transmission ratio is controlled irrespective of the throttle opening degree so that the engine speed increases needlessly at wide open throttle.

Accordingly, it is preferable to vary the correcting quantity in accordance with the engine speed, actual transmission ratio and throttle position. Since the engine speed changes in proportion to the throttle position, the correcting quantity can be controlled dependent on only two factors, namely, actual transmission ratio and throttle position.

SUMMARY OF THE INVENTION

The object of the present invention is to provide a transmission ratio control system wherein the transmission ratio is corrected by a minimum sufficient quantity when the engine power decreases, thereby improving the driveability and reducing fuel consumption.

According to the present invention, there is provided a control system for a continuously variable transmission for transmitting the power of an internal combustion engine mounted on a motor vehicle having an air conditioner operated by the engine, the system comprising a drive pulley having a hydraulically shiftable disc and a hydraulic cylinder for operating the disc, a driven pulley having a hydraulically shiftable disc and a hydraulic cylinder for operating the disc, a belt engaged with both pulleys, a first hydraulic circuit having a pump for supplying oil to both the hydraulic cylinders, a transmission ratio control valve for controlling the oil supplied to the cylinder of the drive pulley to change the transmission ratio to a desired transmission ratio.

The system comprises first means for operating the transmission ratio control valve, an air conditioner switch for detecting use of the air conditioner and for producing an air conditioner signal, first sensing means for sensing operating condition of the engine and the transmission and for producing a first signal dependent on the conditions, second sensing means for sensing load on the engine and for producing a second signal, second means responsive to the first signal for producing an actual transmission ratio signal, third means responsive to the second signal and to the actual transmission ratio signal for producing a desired transmission ratio signal representing the desired transmission ratio, fourth means responsive to the air conditioner signal for increasing the desired transmission ratio signal by a correcting value which is dependent on the actual transmission ratio signal and on the load of the engine. The correcting value is set to increase with decrease of the actual transmission ratio and to decrease with increase of the load on the engine.

The other objects and features of this invention will become understood from the following description with reference to the accompanying drawings.

DETAILED DESCRIPTION OF THE PREFERRED EMBODIMENT

Figure 1:
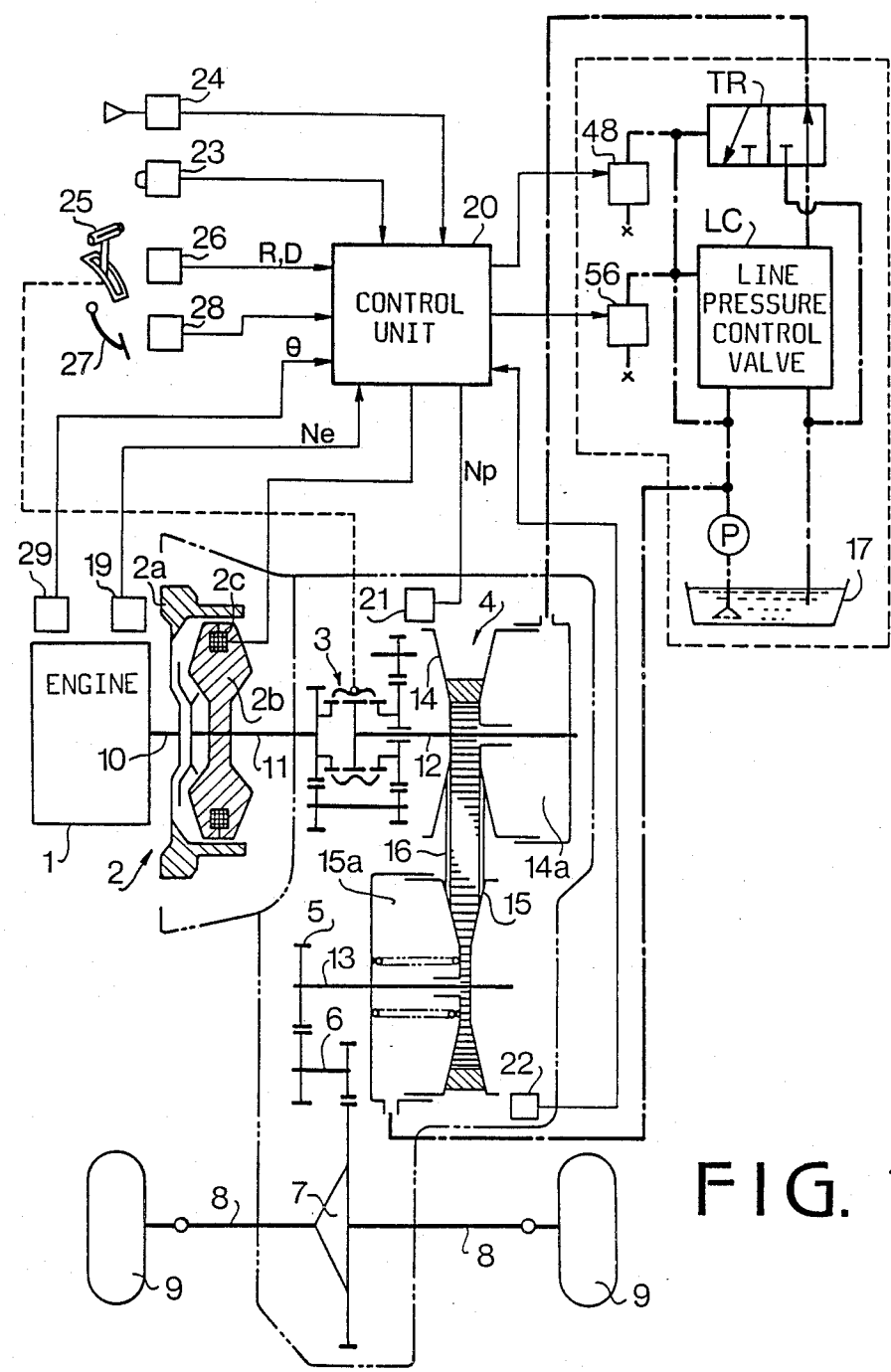
FIG. 1 is a schematic illustration of a continuously variable belt-drive transmission to which the present invention is applied.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D) and a reverse driving position (R).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit. The cylinder 14a is supplied with pressurized oil by an oil pump P from an oil reservoir 17 passing through a line pressure control valve LC and a transmission ratio control valve TR. The cylinder 15a is applied with pressurized oil from the pump P. The hydraulic control circuit is responsive to vehicle speed, engine speed and throttle valve position for controlling the amount of oil supplied to the cylinders 14a and 15a. The pulleys 14 and 15 are operated by compressive forces of the cylinders so that the running diameter of belt 16 is varied to infinitely change the transmission ratio.

An electronic control system for the clutch 2 and the belt-drive transmission 4 has an engine speed sensor 19, and rotating speed sensors 21 and 22 for respectively sensing rotating speeds of the drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing the driving position (D) and the reverse position (R). An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal to the clutch 2 and a control signal for controlling the transmission ratio (i) and a line pressure control signal to the control circuit.

Figure 2A:
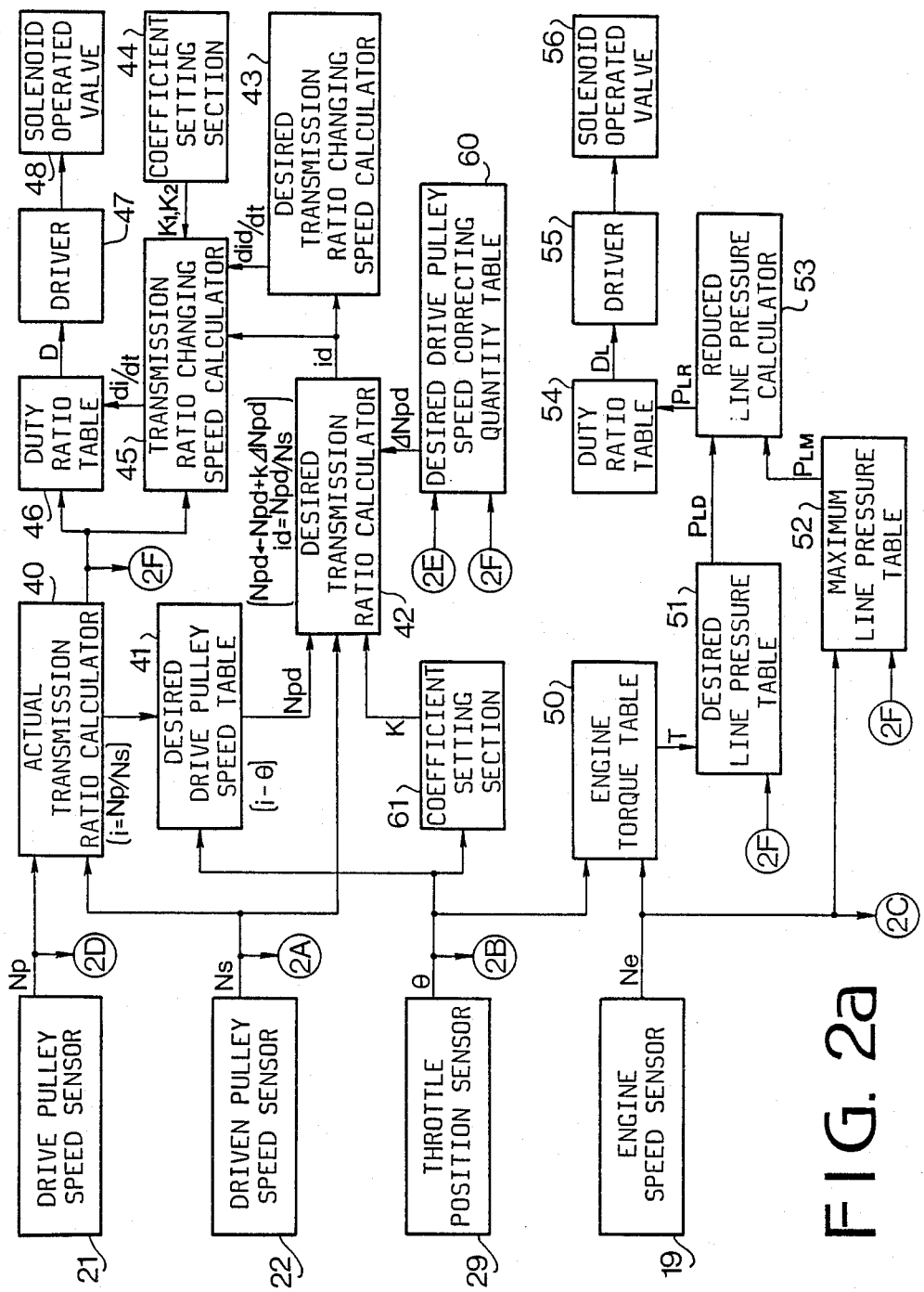
FIGS. 2a and 2b show a block diagram of a control unit according to the present invention.
Figure 2B:
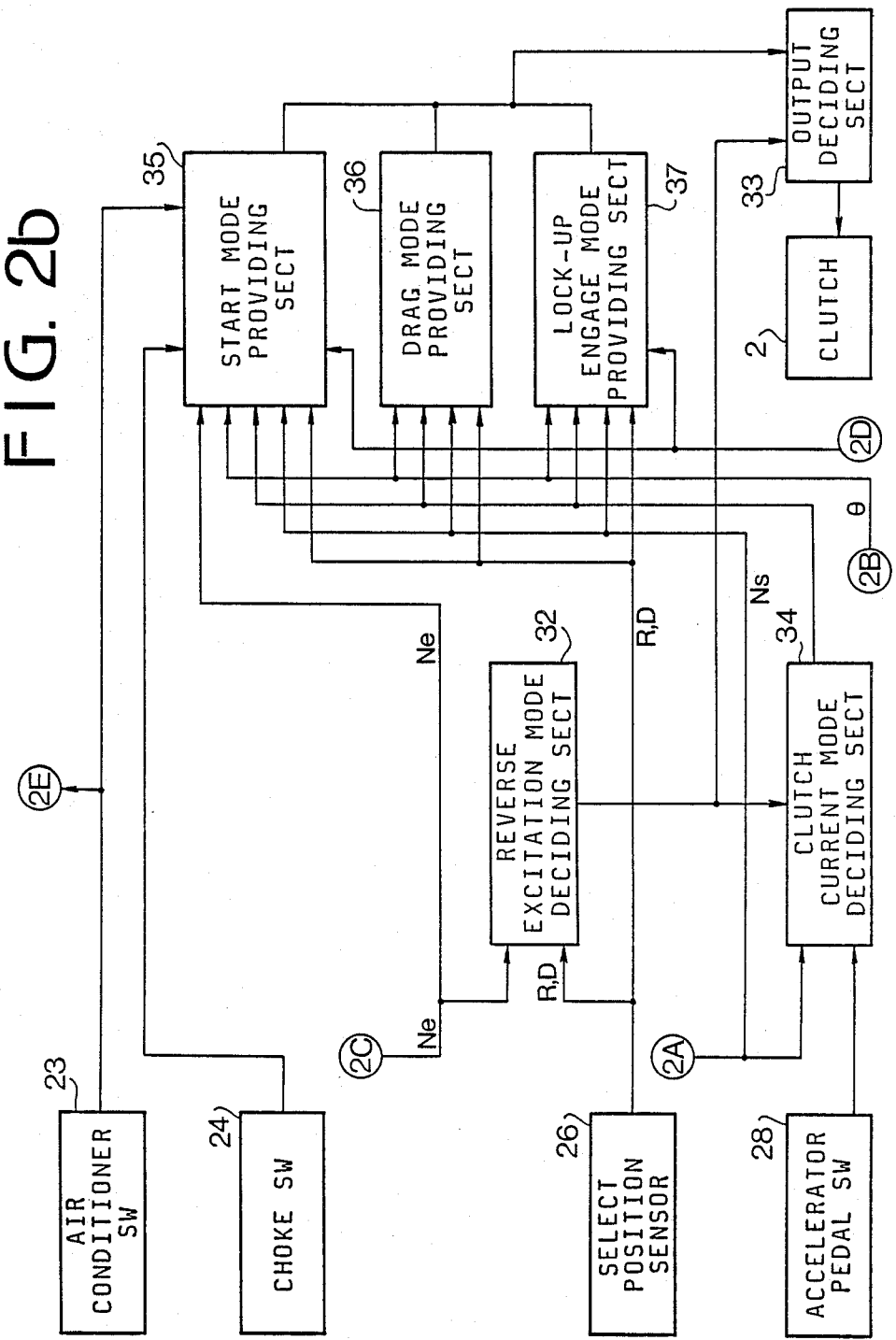

Referring to FIGS. 2a and 2b showing the control unit 20 of FIG. 1, a reverse excitation mode deciding section 32 is applied with engine speed signal Ne of the sensor 19 and drive position signal of the select position sensor 26. When the engine speed Ne is below 300 rpm, or the selector lever 25 is at a neutral position (N) or a parking position (P), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at ordinary start or at closing of the choke switch 24 or air conditioner switch 23. The starting characteristic is corrected by signals from the throttle valve opening degree $\theta$, vehicle speed V, and driving positions (D) and reverse position (R).

The drag mode providing section 36 decides a small drag current when the accelerator pedal 27 is released at a low speed in the driving position and the reverse position for providing a drag torque to the clutch 2 for the reduction of clearances formed in the transmission and for the smooth start of the vehicle.

The clutch lock-up engage mode providing section 37 decides a lock-up current in response to the vehicle speed V and throttle opening degree $\theta$ at the driving position and reverse position for entirely engaging the clutch 2. Outputs of sections 35, 36 and 37 are applied to the output deciding section 33 to control the clutch current.

A system for controlling the transmission ratio and the line pressure will now be described. Output signals $N_P$ and $N_S$ of sensors 21, 22 are fed to an actual transmission ratio calculator 40 to produce an actual transmission ratio i in accordance with $i = N_p/N_S$. The actual transmission ratio i and output signal $\theta$ of the throttle position sensor 29 are fed to a desired drive pulley speed table 41 to derive a desired drive pulley speed Npd in accordance with values of the ratio i and signal $\theta$. The desired drive pulley speed Npd and the driven pulley speed Ns are fed to a desired transmission ratio calculator 42 to calculate a desired transmission ratio id in accordance with the speeds Npd and Ns which corresponds to vehicle speed.

The desired transmission ratio id is fed to a desired transmission ratio changing speed (rate) calculator 43 which produces a desired transmission ratio changing speed (rate) did/dt. The speed did/dt is the amount of change of the desired transmission ratio id during a predetermined time interval. A coefficient setting section 44 is provided for producing coefficients K1 and K2. The actual transmission ratio i, desired transmission ratio id, desired transmission ratio changing speed (rate) did/dt and coefficients K1 and K2 are applied to a transmission ratio changing speed calculator 45 to produce a transmission ratio changing speed di/dt from the following formula.

$$di/dt = K1\ (id - i) + K2 \cdot did/dt$$

In the formula, the term of (id−i) is a control quantity dependent on the difference between the desired and actual transmission ratios and did/dt is a term for advancing the delay in phase caused by a first order lag in the system.

The speed (rate) di/dt and actual ratio i are applied to a duty ratio table 46 to derive a duty ratio D in accordance with D = f (di/dt, i) using a table at upshift and downshift of the transmission. The duty ratio D is supplied to a solenoid operated on-off valve 48 through a driver 47. The valve 48 is provided in the hydraulic circuit, for shifting a spool of the transmission ratio control valve TR to control the transmission ratio.

On the other hand, engine speed Ne from the engine speed sensor 19 and throttle opening degree $\theta$ from the throttle position sensor 29 are applied to an engine torque table 50 to derive an engine torque T. The engine torque T and the actual transmission ratio i from the calculator 40 are applied to a desired line pressure table 51 to derive a desired line pressure $P_{LD}$.

In a hydraulic circuit of the control system oil pressure discharged from the pump varies in accordance with the change of the engine speed Ne, so that a maximum line pressure $P_{LM}$ also varies. In order to detect the variance of the maximum line pressure $P_{LM}$, the control unit is provided with a maximum line pressure table 52 to which the engine speed Ne and the actual transmission ratio i are supplied. Therefore, the maximum line pressure $P_{LM}$ is obtained.

The desired line pressure PLD and the maximum line pressure $P_{LM}$ are applied to a reduced line pressure calculator 53 wherein a reduced line pressure PLR is calculated based on the proportion of the desired line pressure $P_{LD}$ to the maximum line pressure $P_{LM}$. The reduced line pressure $P_{LR}$ is applied to a duty ratio table 54 to derive a duty ratio $D_L$ corresponding to the reduced line pressure $P_{LR}$. The duty ratio $D_L$ is supplied to driver 55 which operates a solenoid operated on-off valve 56 at the duty ratio. The valve 56 is provided in the hydraulic circuit, for shifting a spool of the line pressure control valve LC to control the line pressure.

Figure 3A:
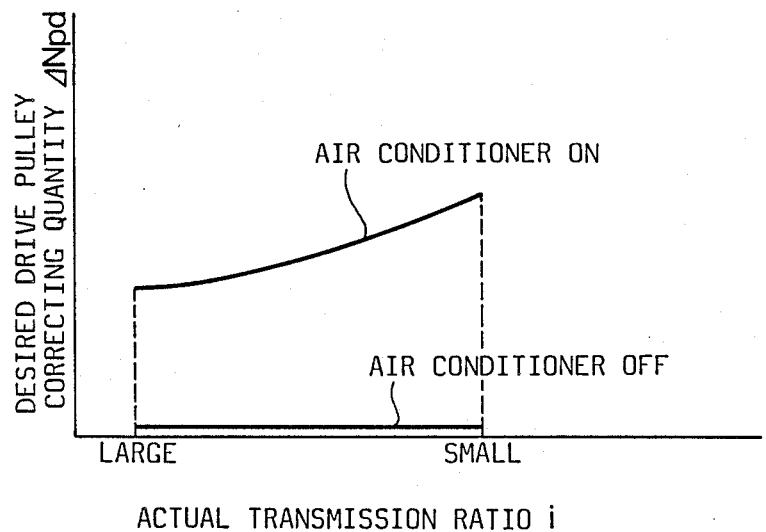
FIG. 3a is a graph showing a characteristic of a desired drive pulley speed correcting quantity.

The control system of the present invention is provided with a desired drive pulley speed correcting quantity table 60 so as to control the transmission ratio when the air conditioner is used. The desired drive pulley speed correcting quantity table 60 is applied with an output signal of the air conditioner switch 23 and the actual transmission ratio i. A desired drive pulley speed correcting quantity $\Delta Npd$ stored in the table 60 is set as shown in FIG. 3a. The correcting quantity $\Delta Npd$ is derived from the table 60 in dependency on the actual transmission ratio i. When the air conditioner switch 23 is off, the correcting quantity $\Delta Npd$ becomes zero. On the other hand, when the air conditioner switch 23 is on, the desired drive pulley speed correcting quantity $\Delta Npd$ increases with the decrease of the transmission ratio i, namely as the transmission is upshifted.

Figure 3B:
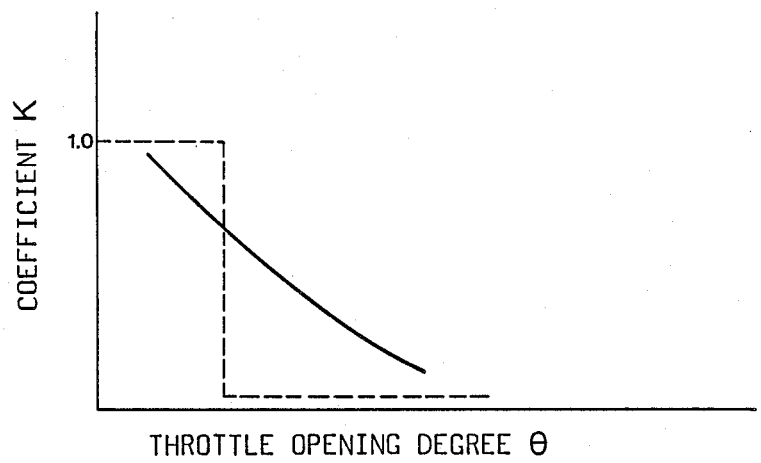
FIG. 3b is a graph showing a characteristic of a correcting coefficient.

The control system is further provided with a coefficient setting section 61 to which the output signal of the throttle position sensor 29 is applied. A coefficient K is set so as to decrease continuously as shown by a solid line in FIG. 3b, or to decrease stepwise as shown by a dotted line, with the increase of the opening degree of the throttle valve. The correcting quantity $\Delta Npd$ and the coefficient K are applied to the desired transmission ratio calculator 42 to correct the desired drive pulley speed as follows.

$$Npd \leftarrow Npd + K \cdot \Delta Npd$$

The desired transmission ratio id is calculated in accordance with the corrected desired drive pulley speed Npd.

In operation, while the vehicle is at a stop, cylinder 15a of the driven pulley 15 is supplied with line pressure, and the cylinder 14a of the drive pulley 14 is drained, since the $N_P$, $N_s$, $\theta$ are zero and duty ratio D is zero. Thus, in the pulley and belt device of the continuously variable belt-drive transmission, the drive belt 16 engages with the driven pulley 15 at a maximum running diameter to provide the largest transmission ratio (low speed stage).

When the accelerator pedal is depressed, the clutch current increases progressively with increase of engine speed. The electromagnetic clutch 2 is gradually engaged, transmitting the engine power to the drive pulley 14. The power of the engine is transmitted to the output shaft 13 at the largest transmission ratio by the drive belt 16 and driven pulley 15, and further transmitted to axles of the driving wheels 9. Thus, the vehicle is started. When the vehicle speed (output signal $N_s$) exceeds a predetermined value, the clutch 2 is entirely engaged.

When the throttle valve is opened for acceleration of the vehicle, the desired transmission ratio id is calculated at the calculator 42 based on the desired drive pulley speed derived from the table 41 and on the throttle position $\theta$. Further, the desired transmission ratio changing speed (rate) did/dt and transmission ratio changing speed (rate) di/dt are calculated at calculators 43 and 45 based on the actual transmission ratio i, desired transmission ratio id and coefficients $K_1$ and $K_2$. The transmission ratio changing speed (rate) di/dt is fed to the duty ratio table 46, so that duty ratio D for valve 48 is obtained from the table 46.

When the accelerator pedal is released, the transmission ratio changing speed (rate) di/dt becomes negative. Accordingly the value of the duty ratio D becomes larger than the neutral value, so that oil is supplied to the cylinder 14a to upshift the transmission. When the actual transmission ratio i reaches the desired transmission ratio id, the changing speed (rate) di/dt becomes zero, so that the upshifting operation stops.

When the drive pulley speed is substantially constant, the desired transmission ratio id calculated based on the desired drive pulley speed Npd and the driven pulley speed Ns has the same value as the desired transmission ratio calculated based on the driven pulley speed Ns and throttle opening degree $\theta$. In a range where the drive pulley speed varies, a proper desired transmission ratio id is calculated based on a desired drive pulley speed Npd derived from the table 41.

As the difference between the desired ratio id and actual ratio i becomes large and the desired transmission ratio changing speed (rate) di/dt becomes large, the duty ratio D for the valve 48 becomes large, thereby increasing the actual transmission changing speed (rate).

When the opening degree of the throttle valve is reduced for deceleration, the duty ratio D is reduced along a low engine speed line, thereby draining the cylinder 14a. Thus, the transmission is downshifted. The transmission changing speed at downshifting increases with reducing of the duty ratio D.

The control operation of line pressure will be described hereinafter. From the engine torque table 50, a torque T is obtained in accordance with throttle opening degree $\theta$ and engine speed $N_e$, which is applied to desired line pressure table 51. The desired line pressure $P_{LD}$ and the maximum line pressure $P_{LM}$ obtained from the table 52 are fed to the reduced line pressure calculator 53. The calculator 53 calculates a reduced line pressure $P_{LR}$. The solenoid operated on-off valve 56 is operated at a duty ratio $D_L$ corresponding to the reduced line pressure $P_{LR}$. The line pressure is applied to cylinder 15a to hold the belt 16 at a necessary minimum force, the transmitting torque at which is slightly larger than torque T. Thus, power is transmitted through the transmission without slipping of the belt.

Figure 4:
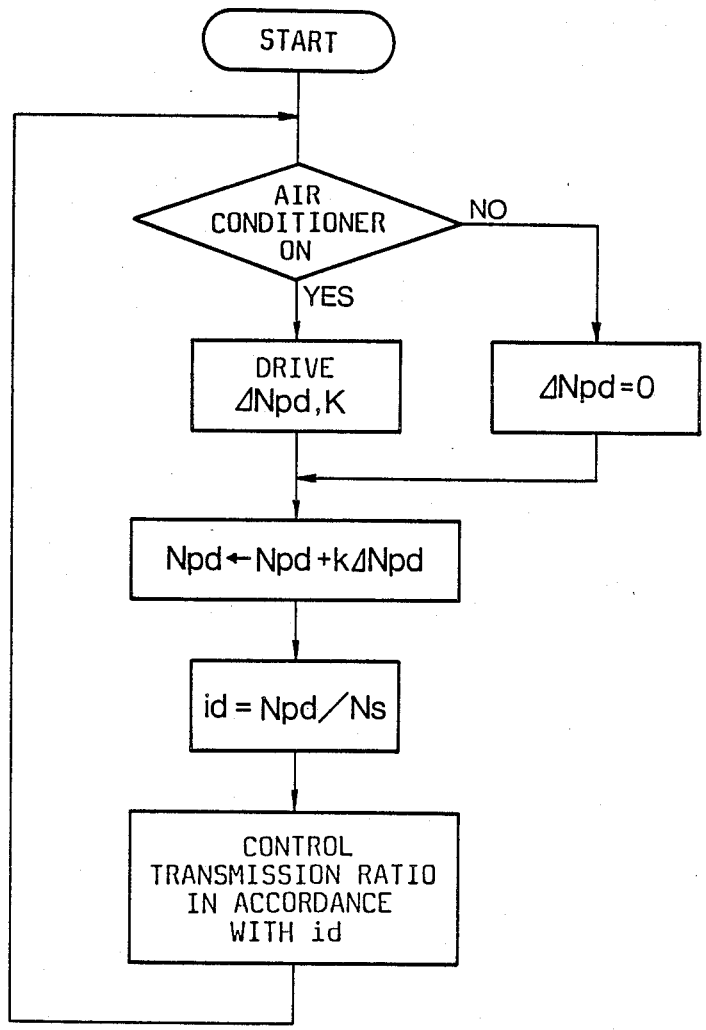
FIG. 4 is a flowchart showing the operation of a control system according to the present invention.

The operation of the system of the present invention during the operation of the air conditioner will be described hereinafter with reference to the flowchart shown in FIG. 4.

When the air conditioner is not used, air conditioner switch 23 is off so that the desired drive pulley speed correcting quantity $\Delta Npd$ in the desired quantity correcting table 60 is zero. Thus, the desired drive pulley speed Npd is calculated in dependence on the actual transmission ratio i and throttle opening degree $\theta$ as hereinbefore described.

On the other hand, when the air conditioner switch 23 is turned on, the desired drive pulley speed correcting quantity $\Delta Npd$ corresponding to the actual transmission ratio i is derived from the table 60. At the same time, the coefficient K corresponding to the throttle opening degree $\theta$ is derived from the coefficient setting section 61. The product of $\Delta Npd$ and $K(\Delta Npd \cdot K)$ is added to the desired drive pulley speed Npd. Thus, the desired drive pulley speed Npd is increased by $K \cdot \Delta Npd$. Accordingly, the desired transmission ratio id and the transmission ratio changing speed (rate) di/dt are increased, thereby decreasing the duty ratio D to downshift the transmission. Therefore, the output of the transmission increases with increase of the engine speed so as to obtain a necessary engine power during the operation of the air conditioner.

Since the desired drive pulley speed correcting quantity $\Delta Npd$ in the table 60 is set at a large value when the actual transmission ratio i is small, the amount of the downshift is increased. Accordingly, the engine speed increases largely greatly in the small transmission ratio range. Therefore, the engine speed is increased by a value substantially equal to that in the large transmission ratio range. On the other hand, the coefficient K in the setting section 61 is set at a large value at a small throttle opening degree so that the transmission is largely greatly downshifted to increase the engine speed. Under a driving condition wherein the throttle opening degree is large, the engine speed easily increases. Accordingly, the coefficient K becomes extremely small in the wide open throttle range so as to restrain the increase of the engine speed, with the aid of the effect by the downshifting.

In accordance with the present invention, there is provided a system for controlling the transmission ratio wherein the engine speed is appropriately increased by a minimum sufficient quantity under any driving condition during the operation of an air conditioner. Thus, necessary engine power can be obtained and the driveability and the fuel consumption are improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for a continuously variable transmission for transmitting the power of an internal combustion engine having a throttle valve, the engine being mounted on a motor vehicle having an air conditioner operated by the engine, the transmission comprising a drive pulley having a hydraulically shiftable disc and a hydraulic cylinder for operating the disc, a driven pulley having a hydraulically shiftable disc and a hydraulic cylinder for operating the disc, and a belt engaged with both pulleys, the control system including sensor means for detecting a position of said throttle valve, a first hydraulic circuit having a pump for supplying oil to both the hydraulic cylinders, and a transmission ratio control valve for controlling the oil supplied to the cylinder to the drive pulley to change the transmission ratio to a desired transmission ratio, the improvement in the control system comprising:

first means for operating the transmission ratio control valve;

an air conditioner switch for detecting use of the air conditioner for producing a air conditioner signal;

sensing means for sensing operating conditions of the engine and the transmission by detecting speeds of said drive and driven pulleys, and for producing a first signal dependent on the conditions;

second means responsive to the first signal for producing an actual transmission ratio signal;

third means responsive to an output signal of the sensor means and to the actual transmission ratio signal for producing a desired pulley speed signal;

fourth means responsive to the air conditioner signal and said actual transmission ratio signal for providing, a correcting value of said desired pulley speed signal, said correcting value being variable dependent on the actual transmission ratio signal and on the output signal; and fifth means responsive to said sensing means, said third means and said fourth means for providing signals representing the desired transmission ratio and a changing rate of said desired transmission ratio to control said transmission ratio control valve via said first means.

2. The control system according to claim 1 wherein the first means is a solenoid operated valve.

3. In a control system for a continuously variable transmission for transmitting the power of an internal combustion engine mounted on a motor vehicle having an air conditioner operated by the engine, the transmission comprising a drive pulley having a hydraulically shfitable disc and a hydraulic cylinder for operating the disc, a driven pulley having a hydraulically shiftable disc and a hydraulic cylinder for operating the disc, and a belt engaged with both pulleys, the control system including a first hydraulic circuit having a pump for supplying oil to both the hydraulic cylinders, and a transmission ratio control valve for controlling the oil supplied to the cylinder of the drive pulley to change the transmission ratio of a desired transmission ratio, the improvement in the control system comprising:

transmission ratio control means for operating the transmission ratio control valve;

an air conditioner switch for detecting use of the air conditioner and for producing an air conditioner signal during use of the air conditioner;

a drive pulley speed sensor for producing a drive pulley speed signal;

a driven pulley speed sensor for producing a driven pulley speed signal;

a throttle position sensor for sensing load on the engine and for producing a load signal;

first calculator means responsive to the drive pulley speed signal and the driven pulley speed signal for producing an actual transmission ratio signal;

means responsive to the load signal and to the actual transmission ratio signal for producing a desired drive pulley speed signal;

second calculator means responsive to the desired drive pulley speed signal and the driven pulley speed signal for producing a desired transission ratio signal;

correcting means responsive to the air conditioner signal for increasing the desired transmission ratio signal by a correcting value which is set to increase with decrease of the actual transmission ratio signal and to decrease with increase of the load signal; and driven means responsive to the desired transmission ratio signal for operating the transmission ratio control means, for controlling the transmission ratio.

4. A control system according to claim 3, wherein said correcting means comprises a coefficient setting section responsive to the load signal, desired drive pulley speed correcting value section responsive to the actual transmission ratio signal and the air conditioner signal, and said second calculator means, the latter being responsive to outputs of said sections.

5. A control system according to claim 4, wherein said second calculator means multiplies said outputs and adds them to said desired drive pulley speed signal and divides the result of the driven pulley speed signal for producing the desired transmission ratio signal.

6. A control system according to claim 5, wherein the output of said coefficient setting section decreases continuously with increase of the load signal.

7. A control system according to claim 5, wherein the output of said coefficient setting section decreases stepwise with increase of the load signal.

8. A control system according to claim 5, wherein the output of said desired drive pulley speed correcting value section increases continuously with decrease of the actual transmission ratio signal.

* * * * *